E. L. PERSONS.
SLIDABLE AND TILTABLE SUPPORT FOR CRACKER CANS AND OTHER RECEPTACLES.
APPLICATION FILED NOV. 30, 1915.
1,188,987.
Patented June 27, 1916.
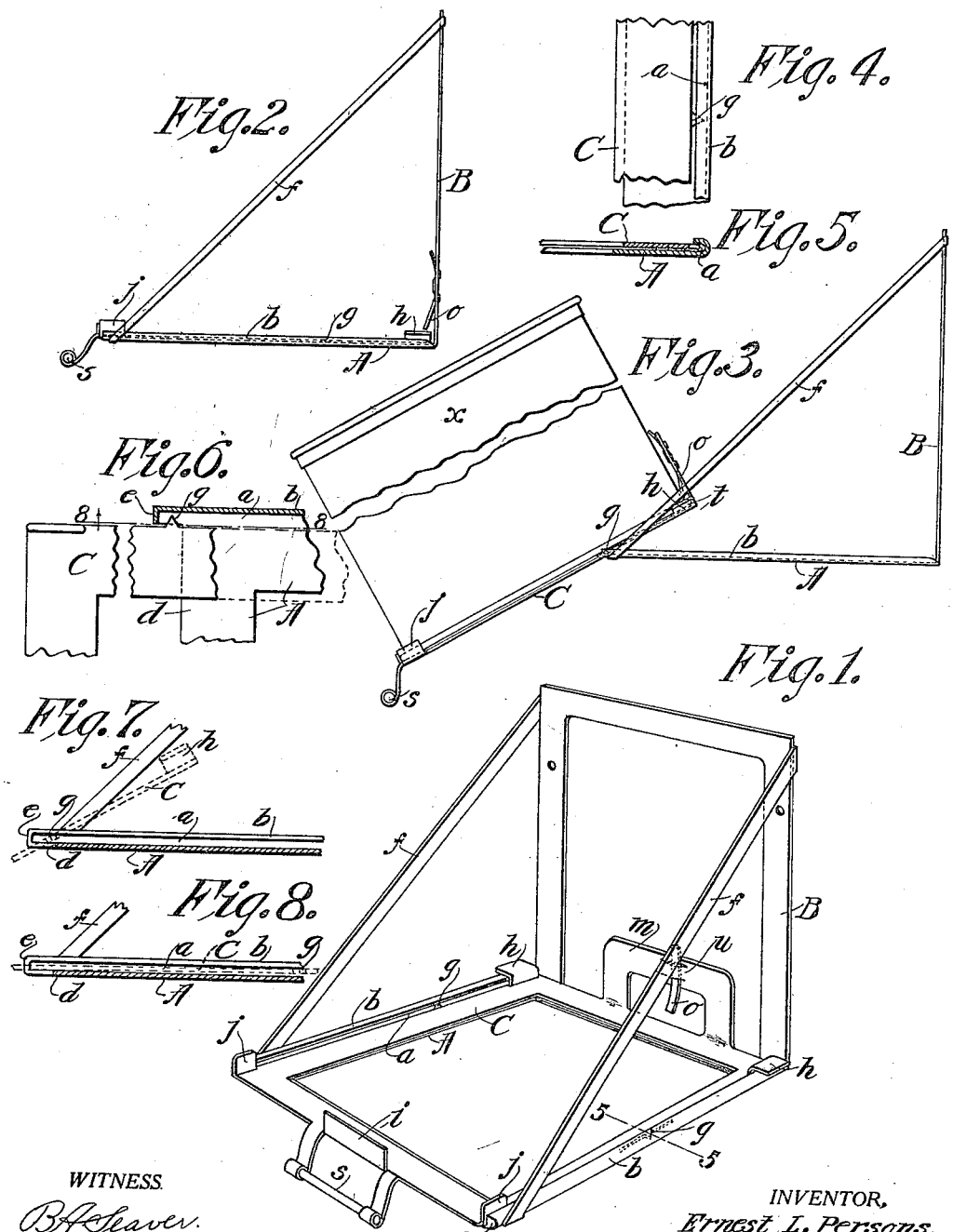
WITNESS.
INVENTOR,
Ernest L. Persons,
BY
ATTORNEY.

UNITED STATES PATENT OFFICE.

ERNEST L. PERSONS, OF HOLYOKE, MASSACHUSETTS.

SLIDABLE AND TILTABLE SUPPORT FOR CRACKER-CANS AND OTHER RECEPTACLES.

1,188,987.   Specification of Letters Patent.   Patented June 27, 1916.

Application filed November 30, 1915.   Serial No. 64,235.

*To all whom it may concern:*

Be it known that I, ERNEST L. PERSONS, a citizen of the United States of America, and resident of Holyoke, in the county of Hampden and State of Massachusetts, have invented certain new and useful Improvements in Slidable and Tiltable Supports for Cracker - Cans and other Receptacles, of which the following is a full, clear, and exact description.

This invention relates to slidable and tiltable supports for merchandise receptacles, of a kind on which, for instance, a tin covered box or can for crackers, cakes, etc., may be supported in a normally rearwardly withdrawn position, but on occasion may be forwardly moved and down tilted in a limited extent for convenient access to the contents of the receptacle.

The objects of the invention are provided in a device of the general character mentioned, a shelf-like support for the receptacle carrier which is slidable thereon, improved means for preventing the down-tilting of the carrier until fully forwardly slid, but permitting such tilting when fully forward, means for limiting the forward sliding of the carrier frame, and means for limiting the extent of its tilting, and also means for the detachable retention of the receptacle on the carrier.

The invention is described in conjunction with the accompanying drawings and is set forth in the claims.

In the drawings: Figure 1 is a perspective view showing the device, from which the receptacle is absent, the carrier frame being in its horizontal rearwardly slid normal position. Fig. 2 is a side elevation of the same. Fig. 3 is a side elevation but showing the carrier frame as forwardly slid and down tilted, and representing a cracker can or other receptacle in place thereon. Fig. 4 is a fragmentary plan view of a side portion of the device. Fig. 5 being a cross section as shown on lines 5—5, Figs. 1 and 4. Fig. 6 is a partial plan view of the forward corner portion of the device showing the carrier as in its forwardly slid position whereat it may be tilted. Figs. 7 and 8 are views as taken along the line 8—8, Fig. 6,—one indicating the carrier frame forward and tilted and the other showing it in rearward position and incapable of being tilted.

In the drawings, A represents a horizontal shelf-like support having upwardly and inwardly turned marginal portions $b$ at its opposite sides whereby inwardly opening channels $a$ are produced.

The channel comprising portions $a$ extend slightly forwardly beyond the front edge $d$ of the frame proper A and have closing end walls $e$ to constitute limiting stops, the utility of which will be hereinafter more fully apparent.

The shelf-like support A has an upstanding back B; and oblique braces $f$ $f$ are provided at opposite sides of the supporting structure extending from upper side portions of the back to forward side portions of the shelf-like support A.

C represents a frame on which a cracker can or other receptacle $x$ is firmly, though detachably, held. This frame is slidable forwardly and rearwardly on the shelf-like support A and is provided at its opposite edges and in transverse alinement, with lateral projections $g$ $g$ which extend to engagement into the aforesaid inwardly open opposite channels of the primary support A. The opposite projections $g$ $g$ have their locations approximately one-third of the way forwardly from the rear edge of the carrier frame. The carrier frame is also provided at or near its rear edge with sidewise located lateral extensions $h$ $h$ which project over the channel side portions $b$ of the shelf support and serve, as represented in Fig. 3, as means for limiting the extent of the forward and downward tilting of the carrier frame when the same is slid forward by engagement against the under edges of the oblique braces $f$ $f$.

It will be perceived with reference to Figs. 1 and 8 that when the carrier frame is slid to any position whereby the projections $g$ $g$ are to the rear of the forward edge $d$ of the support A, the carrier frame cannot tilt on the main support because it has a bearing forward of the position of the projections $g$ and bearing engagements by said projections against the walls of the channel; but when the carrier frame C is forwardly slid relatively to the shelf-like support A, as represented in Figs. 6 and 7, whereby the projections *g* are coincident or slightly forward of the forward edge *d* of the support, there is then but one point or line of transverse bearing engagement between the carrier frame and the support so that the tilting of the carrier frame is permitted.

The carrier frame is provided at its forward edge with an upstanding lip *i* and with opposite side lips *j j* near its forward portion, and at its rear edge it has an upstanding member *m* preferably in the form of a skeleton frame which is provided with a depending forwardly inclined spring tongue *o* which terminates slightly above the upper surface of the carrying frame; said forward lip and tongue constituting a means for the detachable retention of a can or receptacle, which as commonly made is provided with a bead *t* around and outstanding from its bottom. When desired to place a can or box on and to be engaged by the carrier frame it is placed, while in an upwardly and forwardly inclined position, with its bead provided forward corner against the inner face of the upstanding lip *i* and forced down onto the top of the carrier frame. It is then brought to its "righted" position perpendicular to the carrier frame,—its bead provided rear corner snapping or clicking past the spring tongue which then has engagement over the bead. For the removal of the can it is tilted to an upward rearward inclination until the bottom is above the upper edge of the lip *i*, whereupon it may be forwardly drawn from its engagement and removed from the spring and tongue provided frame.

As specifically made, the rear skeleton upstanding frame *m* is provided with a couple of parallel incisions *u, u*, the metal between such incisions is forwardly displaced so as to produce a loop clip between which and the portions of the frame *m* above such incisions the shank of the spring tongue is constrictively retained. The opposite lips *j j* at the front portion of the carrier frame serve as stops for preventing sidewise displacement of the can or receptacle.

The carrier frame has for convenience in the sliding and tilting thereof a handle *s* at its forward central portion.

The device as represented in Fig. 1 may be constructed of light sheet metal, much thereof by stampings; and these slidable and tiltable receptacle supports may be produced at comparatively low cost.

I claim:—

1. In a device of the character described, a shelf-like support having inwardly opening channels at the opposite sides thereof which extend slightly forwardly beyond the front edge of the support proper, and having a vertical back, and oblique braces at opposite sides extending from upper portions of the back to forward portions of the shelf-like support, and a receptacle-carrying frame supported by and slidable forwardly and rearwardly on the shelf-like support, provided at its opposite edges with transversely alined projections which are engaged in the said inwardly open opposite channels, and also provided with sidewise located lateral extensions which project over the channeled side portions of the support and across the planes of said braces.

2. In a device of the character described, a shelf-like support and a receptacle carrying frame supported by and slidable forwardly and rearwardly on the shelf-like support and adapted when forwardly slid to be downwardly tilted and provided with an upstanding lip at its forward edge and with an upstanding member at its rear edge which member is provided with a depending forwardly inclined spring tongue terminating slightly above the carrying frame, said forward lip and tongue provided member constituting a means for the detachable retention of the bead provided receptacle on the frame.

Signed by me at Springfield, Mass., in presence of two subscribing witnesses.

ERNEST L. PERSONS.

Witnesses:
G. R. DRISCOLL,
J. D. LONG.

Copies of this patent may be obtained for five cents each, by addressing the "Commissioner of Patents, Washington, D. C."